(12) United States Patent
Lu et al.

(10) Patent No.: US 8,094,684 B2
(45) Date of Patent: Jan. 10, 2012

(54) LINK TRAINING SCHEME FOR DISPLAYPORT SOURCE REPEATERS

(75) Inventors: Ding Lu, Sunnyvale, CA (US); Zhanpeng Zhang, Shanghai (CN)

(73) Assignee: Parade Technologies, Ltd., Grand Cayman (KY)

( * ) Notice: Subject to any disclaimer, the term of this patent is extended or adjusted under 35 U.S.C. 154(b) by 915 days.

(21) Appl. No.: 12/118,508

(22) Filed: May 9, 2008

(65) Prior Publication Data

US 2009/0279473 A1   Nov. 12, 2009

(51) Int. Cl.
*H04B 7/15* (2006.01)
(52) U.S. Cl. .......................... 370/492; 370/501; 370/293
(58) Field of Classification Search .................. 370/279, 370/293, 315, 492, 501; 345/520
See application file for complete search history.

(56) References Cited

U.S. PATENT DOCUMENTS

| | | | | |
|---|---|---|---|---|
| 2006/0239503 A1* | 10/2006 | Petrovic et al. | ............... | 382/100 |
| 2008/0172501 A1* | 7/2008 | Goodart et al. | ................. | 710/33 |
| 2008/0205519 A1* | 8/2008 | Goodart et al. | .......... | 375/240.12 |
| 2009/0103471 A1* | 4/2009 | Candelore | ...................... | 370/315 |
| 2009/0201312 A1* | 8/2009 | Wu et al. | ........................ | 345/619 |
| 2009/0237412 A1* | 9/2009 | Mawatari et al. | ............. | 345/531 |
| 2009/0251605 A1* | 10/2009 | Hsiao | ............................. | 348/554 |
| 2009/0278763 A1* | 11/2009 | Zeng et al. | ..................... | 345/1.1 |
| 2009/0284536 A1* | 11/2009 | Yoshida | ........................ | 345/520 |
| 2009/0284665 A1* | 11/2009 | Mizoguchi et al. | ........... | 348/738 |

* cited by examiner

*Primary Examiner* — Chi Pham
*Assistant Examiner* — Ahmed Elallam
(74) *Attorney, Agent, or Firm* — Fenwick & West LLP

(57) ABSTRACT

A system and a method for configuring communication between a source device and a sink device using captured configuration data are described. The source device communicates with a repeater, which modifies received data to facilitate transmission to the sink device, using a communication channel. The communication channel transmits video and/or audio data from the source device to the sink device. An auxiliary communication channel is used to communicate configuration data between the source device and sink device to optimize transmission and receipt of data through the communication channel. The repeater is coupled to the auxiliary communication channel and passively captures configuration data from the auxiliary communication channel. The repeater uses a subset of the captured configuration data (e.g., data rate, voltage swing, pre-emphasis, etc.) to modify how the repeater transmits data to the sink device using the communication channel.

18 Claims, 4 Drawing Sheets

LINK TRAINING SCHEME FOR DISPLAYPORT SOURCE REPEATERS

BACKGROUND

1. Field of Art

The present invention generally relates to the field of integrated semiconductor circuits, and more specifically, to high-speed integrated semiconductor circuits for interfacing with digital video or audio.

2. Description of the Related Art

DisplayPort is an industrial standard of digital interface between two or more devices. Commonly, a DisplayPort interface controls transfer of video and/or audio from a source device, such as a computer, a digital video disk (DVD) player or a digital video recorder (DVR), to a sink device, such as a television, a home theater system or a computer monitor. DisplayPort uses two channels, a Main Link and an Auxiliary Channel (AUX-CH) for communication between source device and sink device. The Main Link serially transmits video, audio and other secondary data at rates of 1.62 Gigabits per second (Gbps) or 2.7 Gbps while the AUX-CH carries management and device control data for establishment or configuration of the Main Link at a rate of 1 Megabit per second (Mbps). Transmission of data through the AUX-CH is initiated by the source device allowing the source device to modify Main Link characteristics, although the sink device may prompt modification of the Main Link by sending an interrupt request (IRQ) to the source device via the AUX-CH.

A common function for the AUX-CH is handshaking to train the Main Link between source device and sink device. Depending on the distance between the source device and the sink device, the source device and sink device use different parameter sets to optimize data transmission through the Main Link. Link training allows the source device and sink device to negotiate with each other to determine the optimal Main Link parameter settings for different transmission scenarios. For example, link training allows the source device and sink device to determine values for lane counter, link rate, transmission main link voltage swing, main link pre-emphasis to optimize transmission. For example, when the source device and sink device connected by a short length of DisplayPort cable, a high bit rate is used with minimum voltage swing and no pre-emphasis. Alternatively, when the source device and sink device are connected by a long length of DisplayPort cable, a low bit rate is used with higher voltage swing and pre-emphasis values.

In certain implementations, the source device and sink device are coupled to a repeater device. The repeater device reconditions data transmitted through the Main Link, allowing the Main Link to transmit video and/or audio data over greater distances without degradation. Commonly, the source repeater device is in close proximity to the source device, such as on the same printed circuit board as the source device or within the same housing as the source device. Close proximity of the repeater and source device results in use of the physical layer of the Main Link to transmit video and/or audio data from the source device to the sink device. Hence, the repeater device reconditions video and/or audio data to a remote sink device using the Main Link. However, the source repeater device does not automatically adjust the Main Link configurations responsive to the link training configuration and/or maintenance that is transmitted through the AUX-CH. Therefore, positioning the repeater device close to the source device impairs the accuracy of link training by the source device as the source device bases configuration on the short distance between source device and repeater device rather than the complete distance between source device and sink device.

SUMMARY

In an embodiment, a repeater comprises a listening module which is coupled to an auxiliary communication channel which communicates configuration data between a source device and a sink device. The listening module captures configuration data that is transmitted using the auxiliary communication channel. An interceptor is coupled to the listening module and classifies configuration data captured by the listening module. The interceptor allows generation of a subset of the captured configuration data having specific characteristics, such as data associated with link training. A parameter setting module is coupled to the interceptor and modifies a configuration setting of the repeater responsive to a subset of the captured configuration data. This allows the repeater to be configured responsive to data transmitted between the source device and the sink device so that the repeater and source device are configured using the same configuration data. This beneficially allows the repeater to more accurately replicates the characteristics of the source device.

In an embodiment, a communication channel is established between a source device and a repeater and used to communicate data. An auxiliary communication channel is also established between the source device and the sink device and used to communicate configuration data. The repeater then captures configuration data from the auxiliary communication channel. In an embodiment, the repeater passively captures the configuration data from the auxiliary communication channel, allowing the repeater to monitor the communicated data without disrupting the flow of data between source device and sink device. A characteristic of the repeater is then modified responsive to a subset of the captured configuration data, allowing the configuration data to be used to modify performance of the repeater as well as the source device. This allows the repeater to approximate performance of the source device, which improves transmission of data using the communication channel.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
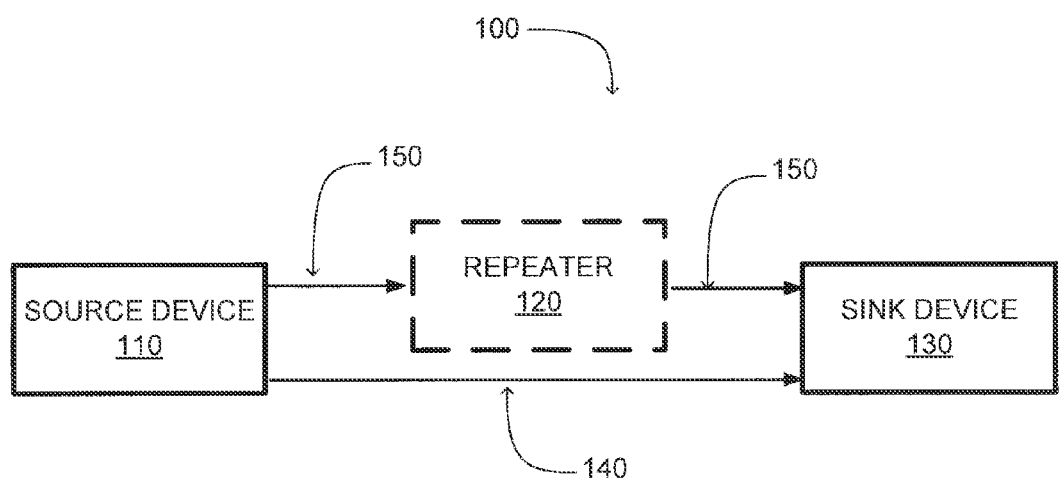
FIG. 1 is a block diagram of a conventional data transmission system.

A system and method for configuring a communication channel including a repeater device coupled to a source device and a sink device are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form to avoid obscuring the invention.

Reference will now be made in detail to several embodiments, examples of which are illustrated in the accompanying Figures. It is noted that wherever practicable similar or like reference numbers may be used in the figures and may indicate similar or like functionality. The Figures depict embodiments of the present invention for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

Referring now to FIG. 1, it illustrates one embodiment of a conventional system 100 for communicating data between a source device 110 and a sink device 130. In an embodiment, the conventional system 100 also includes a repeater 120 which is coupled to the source device 110 and the sink device 130. The conventional system 100 includes two data transmission channels, an Auxiliary Channel (AUX-CH) 140 and a Main Link 150.

The source device 110 is any device which transmits video and/or audio data, such as a digital video recorder (DVR), a digital video disk player (DVD) player, a computer, a hard drive or another storage device including video and/or audio data. In the conventional system 100, the source device 110 is the master device and the sink device 130 is the slave device. Hence, the source device 110 initiates communication with a sink device 130 and also modifies characteristics of the Main Link 150 communication channel between source device 110 and sink device 130.

In an embodiment, a repeater 120 is coupled to the source device 110 and the sink device 130. For example, the repeater 120 receives input from the source device 110 via the Main Link 150 and then reconditions the received signal from the source device 110. The reconditioned signal is then transmitted from the repeater 120 to the sink device 130 using the Main Link 150. Hence, the repeater 120 allows transmission of high-quality video and/or audio data between the source device 110 and the sink device 130, even when the source device 110 and the sink device 130 are physically remote from each other.

The sink device 130 is any device which receives video and/or audio data, such as a television (TV), computer monitor, home theater system or other device which receives and processes video and/or audio data. Although the sink device 130 is the slave device, the sink device 130 may also initiate Main Link 150 configuration. In an embodiment the sink device 130 prompts initiation Main Link 150 configuration by sending an interrupt request (IRQ) to the source device 110.

The AUX-CH 140 is a bi-directional communication link which transmits data for establishing or configuration the Main Link 150 between the source device 110 and the sink device 130 or transmits data for controlling the source device 110 or sink device 130. For example, the AUX-CH 140 comprises an Alternating Current (AC) coupled, doubly terminated differential pair. In an embodiment, the AUX-CH 140 transmits data at a rate of 1 Megabit per second (Mbps). Additionally, the AUX-CH 140 is used for the initial "handshake" establishing the Main Link 150 between source device 110 and sink device 130. Further, the source device 110 uses the AUX-CH 140 to check the validity and status of the Main Link 150 and also uses the AUX-CH to implement any modifications to the Main Link 150. Hence, the AUX-CH 140 is used to establish and maintain the Main Link 150 connection between source device 110 and sink device 130.

As the AUX-CH 140 communicates configuration and/or control data, the Main Link 150 transmits video and/or audio data from the source device 110 to the sink device 130. The Main Link 150 is a uni-directional communication channel which transmits video and/or audio data from source device 110 to sink device 130. For example, the Main Link 150 comprises one or more AC-coupled, doubly-terminated differential pairs, commonly referred to as "lanes." In an embodiment, the Main Link 150 supports two data rates, 2.7

Gigabits per second (Gbps) and 1.62 Gbps. Hence, the Main Link 150 allows for high-speed transmission of video and/or audio data from source device 110 to sink device 130 without link or device configuration or maintenance data.

Figure 2:
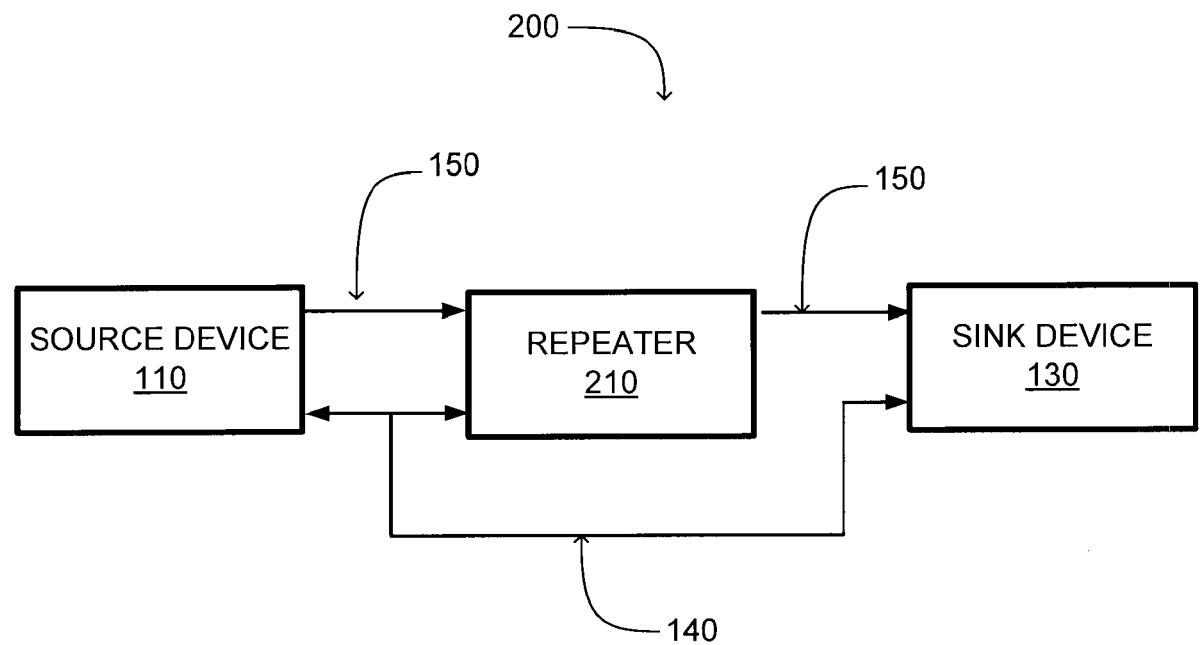
FIG. 2 is a block diagram of a system for transmitting video data and configuration data according to one embodiment of the invention.

FIG. 2 shows a block diagram of a system 200 for transmitting video data and configuration data according to one embodiment of the invention. The system 200 includes a source device 110 and a sink device 130. Additionally, an AUX-CH 140 and a Main Link 150 are used to transmit configuration data and video and/or audio data, respectively. The source device 110, sink device 130, AUX-CH 140 and Main Link 150 are further described above in conjunction with FIG. 1.

However, in system 200, the repeater 210 is coupled to both the AUX-CH 140 and the Main Link 150. The repeater 210 receives input video and/or audio data from the source device 110 via the Main Link 150 then reconditions the received video and/or audio data. The reconditioned video and/or audio data is then transmitted from the repeater 210 to the sink device 130 using the Main Link 150. Additionally, the repeater 210 receives data transmitted from the sink device 130 to the source device 110 or from source device 110 to sink device 130 using the AUX-CH 140. Hence, the AUX-CH 140 is coupled to the source device 110 and the sink device 130 and is also coupled to the repeater 210. This allows the repeater 210 to passively monitor data transmitted between the source device 110 and sink device 130 using the AUX-CH 140. As both the source device 110 and the repeater 210 are coupled to the AUX-CH 140, data from the AUX-CH 140 configures both the source device 110 and the repeater 210, enabling the repeater 210 configuration to be similar to the source device 110 configuration.

In addition to monitoring data transmitted between the source device 110 and sink device 130 using the AUX-CH 140, the repeater 210 also intercepts a subset of the data transmitted via the AUX-CH 140. For example, the repeater 210 intercepts data or commands associated with link training or similar configuration data or commands. The repeater 210 then modifies one or more parameters of the repeater 210 to adjust how video and/or audio data is transmitted via the Main Link 150. This allows modification of one or more repeater 210 parameters to optimize the quality of the video and/or audio data received by the sink device 130. The repeater 210 is further described below in conjunction with FIG. 3.

Figure 3:
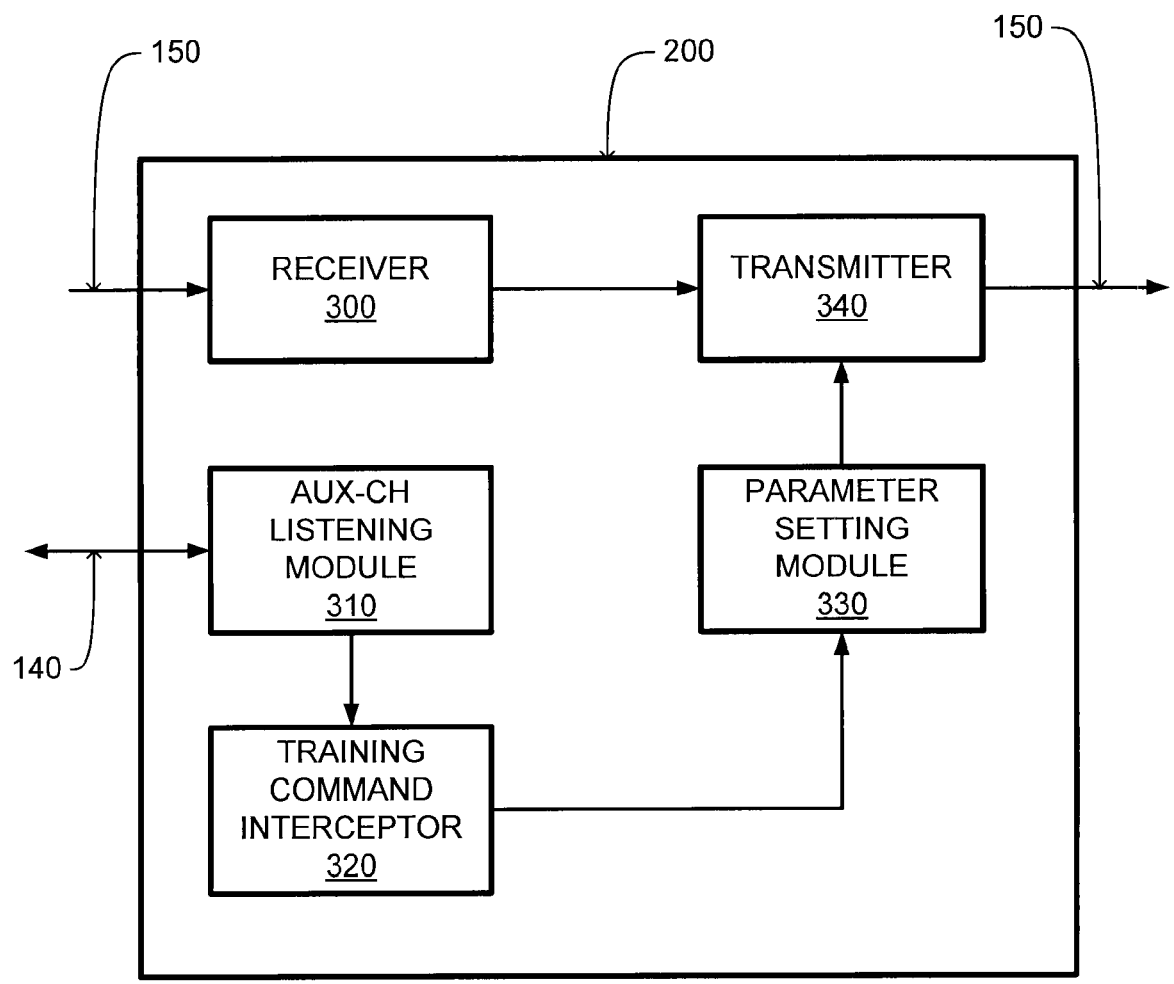
FIG. 3 is a block diagram of a repeater for configuring communication between a source device and a sink device according to one embodiment of the invention.

FIG. 3 is a block diagram of a repeater 210 for configuring communication between a source device 110 and a sink device 130 according to one embodiment of the invention. The repeater 210 comprises a receiver 300, an AUX-CH listening module 310, a training command interceptor 320, a parameter setting module 330 and a transmitter 340. However, in other embodiments, the repeater 210 includes different and/or additional components than the ones shown in FIG. 3.

In one embodiment, a receiver 300 receives video and/or audio data from the Main Link 150. The receiver 300 is coupled to a transmitter 340, which receives the video and/or audio data from the receiver 300. The transmitter 340 then reconditions the video and/or audio data and transmits the reconditioned video and/or audio data to a sink device 130, or other device, using the Main Link 150. Additionally, the repeater 200 includes an AUX-CH listening module 310 which is coupled to the AUX-CH 140 and to a training command interceptor 320. The AUX-CH listening module 310 passively receives data transmitted via the AUX-CH 140 and communicates the received data to the training command interceptor 320. The training command interceptor 320 is also coupled to the parameter setting module 330 and communicates one or more commands or data captured from the AUX-CH 140 to the parameter setting module 330. The parameter setting module 330 is coupled to the transmitter 340 and modifies one or more parameters associated with the transmitter 340 responsive to the commands received from the training command interceptor 320.

The receiver 300 is coupled to the Main Link 150 and to the transmitter 340. The receiver 300 receives video and/or audio data from the Main Link 150 as input and communicates the received data to the transmitter 340. In various embodiments, the receiver 300 comprises any device which receives video and/or audio data.

The AUX-CH listening module 310 is coupled to the AUX-CH 140 and passively monitors the AUX-CH 140. Additionally, the AUX-CH listening module 310 is also coupled to the training command interceptor 320, allowing the AUX-CH listening module 310 to communicate data from the AUX-CH 140 to the training command interceptor 320. This allows the AUX-CH listening module 310 to non-intrusively monitor data transmitted via the AUX-CH 140 and capture data transmitted using the AUX-CH 140 without disrupting transmission of data between source device 110 and sink device 130 via the AUX-CH 140. In one embodiment, the AUX-CH listening module 310 generates a copy of data transmitted through the AUX-CH 140 without altering or delaying transmission of data between source device 110 and sink device 130.

The training command interceptor 320 compares data received from the AUX-CH listening module 310 with stored information describing data types and/or commands to identify a subset of the transmitted data for further processing. For example, the training command interceptor 320 compares data transmitted via the AUX-CH 140 to data describing link training commands and stores link training commands and not other types of data transmitted via the AUX-CH 140. Hence, the training command interceptor 320 reduces the amount of captured data that is subsequently processed by the parameter setting module 330. This allows identification of the captured data most relevant to configuring one or more transmitter 340 settings and discarding of captured data less relevant to transmitter 340 configuration. For example, the training command interceptor 320 identifies commands associated with link training and communicates those commands to the parameter setting module 330 while discarding other commands.

The parameter setting module 330 is coupled to the training command interceptor 320 and to the transmitter 340. Data or commands captured by the training command interceptor 320 are communicated to the parameter setting module 330 as input. Responsive to the received data or commands, the parameter setting module 330 outputs parameter settings to the transmitter 340 to modify one or more characteristics of the transmitter 340. This allows the transmitter 340 to substantially replicate the settings of the source device 110 by performing the configuration commands transmitted to the source device 110 at the repeater 200. Hence, the parameter setting module 330 adjusts one or more transmitter 340 characteristics responsive to the captured data, so that data from the AUX-CH 140 configures both the source device 110 and the transmitter 340, which improves the quality of the video and/or audio data transmitted by the repeater 200.

In various embodiments, the AUX-CH listening module 310, the training command interceptor 320 and the parameter setting module 330 comprise one or more processes executable by a hardware state machine, a processor (not shown) and/or one or more firmware applications. The process or processes can be configured to operate on a general purpose microprocessor or controller, a field programmable gate array (FPGA), an application specific integrated circuit (ASIC) or a combination thereof. In an embodiment, one or more of the AUX-CH listening module 310, the training command interceptor 320 and the parameter setting module 330 comprise a processor configured to process data describing events which may comprise various computing architectures including a complex instruction set computer (CISC) architecture, a reduced instruction set computer (RISC) architecture or an architecture implementing a combination of instruction sets. A single processor or multiple processors can be used to implement one or more of the AUX-CH listening module 310, the training command interceptor 320 and the parameter setting module 330.

For purposes of illustration, FIG. 3 shows the AUX-CH listening module 310, the training command interceptor 320 and the parameter setting module 330 as discrete modules. However, in various embodiments, any or all of the AUX-CH listening module 310, the training command interceptor 320 and the parameter setting module 330 can be combined, allowing a single module to perform the functions of one or more of the above-described modules.

The transmitter 340 is coupled to the Main Link 150 and the receiver 300. The transmitter 340 receives data from the receiver 300 then reconditions or replicates the received data to facilitate communication of the video and/or audio data. The transmitter 340 is also coupled to the parameter setting module 330 which modifies data amplification, data replication or other characteristics associated with the transmission of video and/or audio data responsive to data from the AUX-CH 140. The transmitter then communicates the modified video and/or audio data to a remote device, such as the sink device 130, using the Main Link 150.

System Operation

Figure 4:
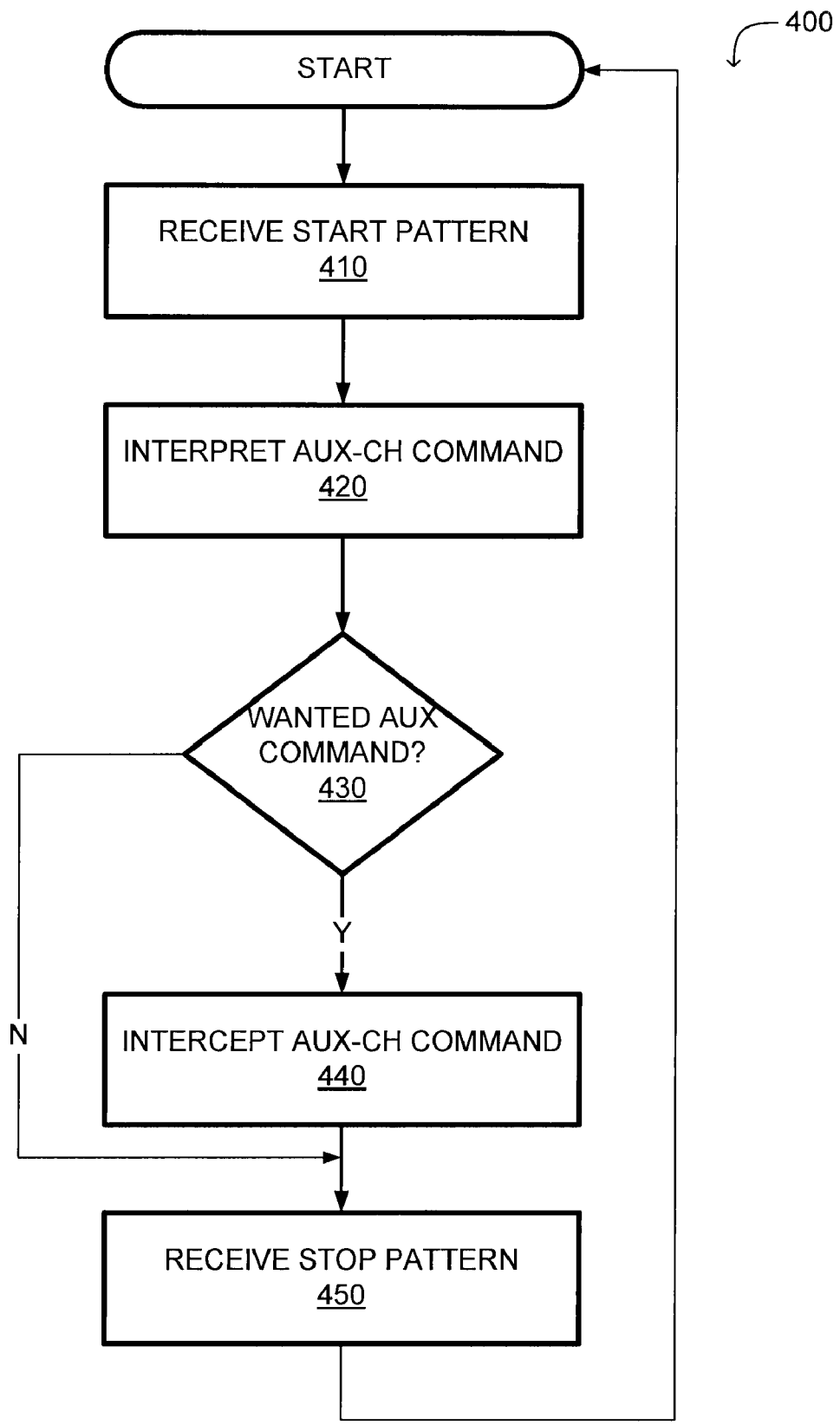
FIG. 4 is a flow chart of a method for passively capturing data from an auxiliary channel and configuring communication between a source device and a sink device according to one embodiment of the invention.

FIG. 4 is a flow chart of a method 400 for passively capturing data from an auxiliary channel and configuring communication between a source device and a sink device according to one embodiment of the invention. Those of skill in the art will recognize that other embodiments can perform the steps of FIG. 4 in different orders or include different and/or additional steps than the ones described herein.

Initially, the AUX-CH listening module 310 receives 410 a command, or a pattern of commands indicating the start of communication between the source device 110 and the sink device 130 via the AUX-CH 140. For example, the AUX-CH listening module 310 receives 410 an initialization message or initialization packet as input. After the command, or pattern of commands, indicating the start of communication, one or more commands are transmitted between the source device 110 and the sink device 130 using the AUX-CH 140. The received commands are communicated from the AUX-CH listening module 310 to the training command interceptor 320 included in the repeater 200. The training command interceptor 320 then interprets 420 the AUX-CH commands as they are received, allowing the training command interceptor 320 to identify different command types or to identify the purpose of subsequent commands.

After interpreting 420 a received command, the training command interceptor 320 determines 430 whether the received command is wanted. This allows the training command interceptor 320 to identify a subset of the received commands for further processing while disregarding other received commands. For example, the training command interceptor compares one or more values of a received command with stored values identifying a desired command. Examples of desired commands include commands modifying data transfer rate, Main Link voltage swings, Main Link pre-emphasis or other commands associated with link training. Responsive to determining 430 that a command is not associated with the stored values identifying a desired command, the AUX-CH listening module 310 and training command interceptor 320 enter an idle state awaiting transmission of subsequent commands, such as a message or series of messages indicating that transmission has stopped.

However, responsive to determining 430 a received command is associated with a stored value identifying a desired command, the received command is intercepted 440 by the training command interceptor 320. In one embodiment, the training command interceptor 320 generates a replica of the desired command which is communicated to the parameter setting module 330. After receiving the replica of the desired command, the parameter setting module 330 extracts information from the replica of the desired command and uses the extracted information to identify one or more parameter settings which are communicated to the transmitter 340. The transmitter 340 then uses the received parameter settings to modify one or more operational characteristics, allowing modification of how the transmitter 340 communicates data using the Main Link 150. Alternatively, the parameter setting module 330 executes the received command, causing one or more configuration operations to be performed on the transmitter 340. This modifies the transmitter 340 responsive to the received AUX-CH 140 data, allowing the AUX-CH 140 data to configure both the source device 110 and transmitter 340

Upon receiving 450 a command, or pattern of commands, indicating the termination of communication between the source device 110 and the sink device 130, the AUX-CH listening module 310, training command interceptor 320 and parameter setting module 330 enter an idle state until data indicating the start of a new communication is received 410. This idle state reduces the power consumption of the AUX-CH listening module 310, training command interceptor 320 and parameter setting module 330.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for configuring communication between a source device and a sink device comprising:
   a main communication channel coupled to the source device, the main communication channel communicating data from the source device;
   an auxiliary communication channel coupled to the source device and the sink device, the auxiliary communication channel communicating configuration data from the source device; and
   a repeater coupled to the main communication channel and the auxiliary communication channel, the repeater receiving data from the source device using the main channel and transmitting the received data from the source device to the sink device, the repeater capturing configuration data from the auxiliary communication channel and modifying one or more parameters responsive to a subset of the configuration data captured from the auxiliary communication channel.

2. The system of claim 1, wherein the repeater modifies transmission of received data from the source device to the sink device responsive to the subset of the configuration data captured from the auxiliary communication channel.

3. The system of claim 1, wherein the subset of the configuration data captured from the auxiliary communication channel comprises link training data.

4. The system of claim 3, wherein the link training data comprises at least one from the group of data transfer rate, communication channel voltage swings and communication channel pre-emphasis.

5. The system of claim 1, wherein the repeater passively captures the configuration data from the auxiliary communication channel.

6. An apparatus for communicating data between a source device and a sink device comprising:
   a listening module coupled to an auxiliary channel, the auxiliary channel communicating configuration data between the source device and the sink device, wherein the listening module captures configuration data from the auxiliary communication channel;
   an interceptor coupled to the listening module, the interceptor classifying the captured configuration data from the auxiliary communication channel; and
   a parameter setting module coupled to the interceptor, the parameter setting module modifying a configuration setting responsive to a subset of the captured configuration data from the auxiliary communication channel.

7. The apparatus of claim 6, further comprising:
   a receiver coupled to a communication channel, the receiver receiving data from the source device; and
   a transmitter coupled to the receiver and the parameter setting module, the transmitter transmitting data to the sink device using the communication channel, wherein the parameter setting module modifies transmission of data from the transmitter to the sink device responsive to the subset of the captured configuration data from the auxiliary communication channel.

8. The apparatus of claim 6, wherein the subset of the configuration data captured from the auxiliary communication channel comprises link training data.

9. The apparatus of claim 8, wherein the link training data comprises at least one from the group of data transfer rate, communication channel voltage swings and communication channel pre-emphasis.

10. The apparatus of claim 6, wherein the listening module passively captures the configuration data from the auxiliary communication channel.

11. A method for configuring data communication between a source device and a sink device comprising:
    establishing a communication channel between the source device and a repeater, the communication channel for communicating data;
    establishing an auxiliary communication channel between the source device and the sink device, the auxiliary communication channel communicating configuration data;
    capturing configuration data from the auxiliary communication channel using the repeater; and
    responsive to a subset of captured configuration data from the auxiliary communication channel, modifying a characteristic of the repeater.

12. The method of claim 11, wherein modifying a characteristic of the repeater comprises modifying transmission of received data from the source device to the sink device.

13. The method of claim 11, wherein the subset of captured configuration data comprises link training data.

14. The method of claim 13, wherein the link training data comprises at least one from the group of data transfer rate, communication channel voltage swings and communication channel pre-emphasis.

15. A computer program product for configuring data communication between a source device and a sink device, the computer program product comprising a non-transitory computer-readable storage medium storing instructions that when executed cause at least one processor to:
    establish a communication channel between the source device and a repeater, the communication channel for communicating data;
    establish an auxiliary communication channel between the source device and the sink device, the auxiliary communication channel communicating configuration data;
    capture configuration data from the auxiliary communication channel using the repeater; and
    responsive to a subset of captured configuration data from the auxiliary communication channel, modify a characteristic of the repeater.

16. The computer program product of claim 15, wherein modifying a characteristic of the repeater comprises modifying transmission of received data from the source device to the sink device.

17. The computer program product of claim 15, wherein the subset of captured configuration data comprises link training data.

18. The computer program product of claim 17, wherein the link training data comprises at least one from the group of data transfer rate, communication channel voltage swings and communication channel pre-emphasis.

* * * * *